United States Patent
Xue et al.

(10) Patent No.: US 10,643,644 B1
(45) Date of Patent: May 5, 2020

(54) WRITE POLE WITH VARIED SIDEWALL SHAPE

(71) Applicant: Seagate Technology LLC, Cupertino, CA (US)

(72) Inventors: Jianhua Xue, Maple Grove, MN (US); Yan Dong, Chanhassen, MN (US); Gregory P. Wakeham, Bloomington, MN (US); Yong Luo, Plymouth, MN (US); Wei Tian, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/895,371

(22) Filed: Feb. 13, 2018

Related U.S. Application Data

(60) Provisional application No. 62/458,827, filed on Feb. 14, 2017.

(51) Int. Cl.
*G11B 5/31* (2006.01)
*G11B 5/127* (2006.01)

(52) U.S. Cl.
CPC .......... *G11B 5/3116* (2013.01); *G11B 5/1278* (2013.01); *G11B 5/315* (2013.01)

(58) Field of Classification Search
None
See application file for complete search history.

(56) References Cited

U.S. PATENT DOCUMENTS

| | | | |
|---|---|---|---|
| 7,530,159 B2 | 5/2009 | Lee et al. | |
| 7,549,213 B2 | 6/2009 | Hsu et al. | |
| 8,189,294 B2 | 5/2012 | Edelman et al. | |
| 8,259,411 B2 | 9/2012 | Yang et al. | |
| 8,279,562 B2 | 10/2012 | Gao et al. | |
| 8,305,711 B2 | 11/2012 | Li et al. | |
| 8,345,385 B2 | 1/2013 | Gao et al. | |
| 8,405,932 B2 | 3/2013 | Seigler et al. | |
| 8,520,337 B1* | 8/2013 | Liu et al. | G11B 5/3116 360/125.13 |
| 8,582,234 B2 | 11/2013 | Linville et al. | |
| 8,767,347 B1* | 7/2014 | Sasaki et al. | G11B 5/315 360/125.13 |
| 8,810,964 B2 | 8/2014 | Gao et al. | |
| 8,830,624 B2 | 9/2014 | Luo et al. | |
| 8,848,315 B2 | 9/2014 | Yang et al. | |
| 9,218,825 B2 | 12/2015 | Xue et al. | |
| 9,336,798 B1* | 5/2016 | Sasaki et al. | G11B 5/315 |
| 9,478,236 B1 | 10/2016 | Liu et al. | |
| 2003/0112555 A1* | 6/2003 | Sato et al. | G11B 5/3116 360/125.47 |
| 2008/0180840 A1* | 7/2008 | Yatsu et al. | G11B 5/1278 360/125.1 |
| 2010/0157483 A1* | 6/2010 | Ohtsu | G11B 5/3116 360/246.2 |

(Continued)

*Primary Examiner* — Craig A. Renner
(74) *Attorney, Agent, or Firm* — Westman, Champlin & Koehler, P.A.

(57) ABSTRACT

A write head having a write pole tip. The write pole tip includes a bearing surface and a sidewall extending from the bearing surface to a rear end of the write pole tip. The sidewall has a first shape (e.g., a straight-line sidewall shape) substantially at the bearing surface and a second shape (e.g., a multi-segment sidewall shape or a curved sidewall shape) between the bearing surface and the rear end.

16 Claims, 8 Drawing Sheets

(56) References Cited

U.S. PATENT DOCUMENTS

| | | | |
|---|---|---|---|
| 2011/0222188 A1* | 9/2011 | Etoh et al. | G11B 5/3116 360/123.12 |
| 2012/0327535 A1* | 12/2012 | Meloche et al. | G11B 5/3116 360/125.01 |
| 2015/0380016 A1* | 12/2015 | Sasaki et al. | G11B 5/3116 360/119.02 |
| 2016/0055869 A1* | 2/2016 | Sasaki et al. | G11B 5/3116 360/319 |

* cited by examiner

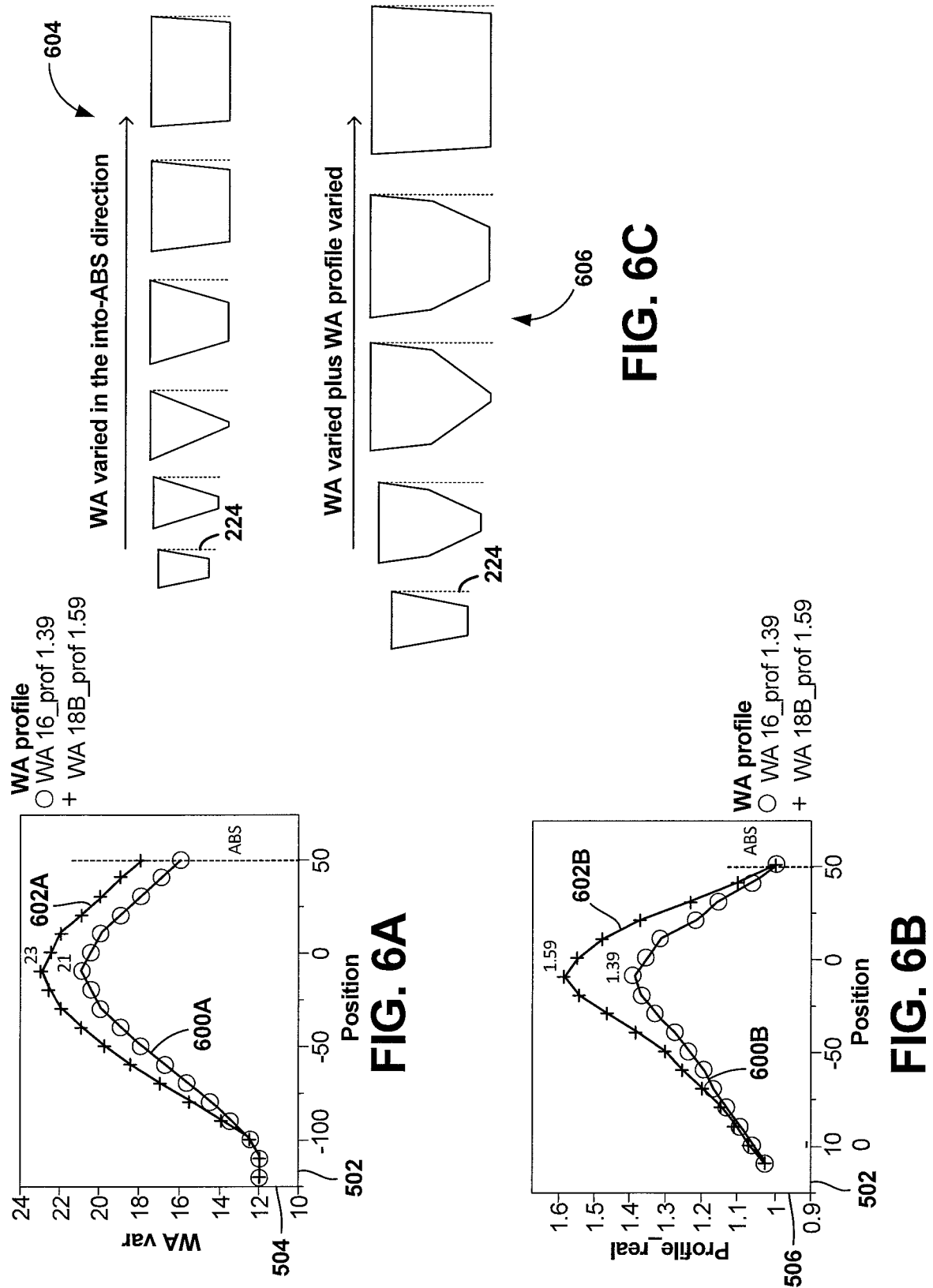

WRITE POLE WITH VARIED SIDEWALL SHAPE

CROSS-REFERENCE TO RELATED APPLICATION

This application is a non-provisional application of U.S. provisional application No. 62/458,827, filed on Feb. 14, 2017, the content of which is hereby incorporated by reference in its entirety.

BACKGROUND

Data storage devices use magnetic recording heads to read and/or write data on magnetic storage media, such as a data storage discs. Magnetic recording heads typically include inductive write elements to record data on the storage media. An inductive write element or transducer may include a main pole or write pole having a pole tip and one or more return poles. Current is supplied to write coils to induce a flux path in the write pole to record data on one or more magnetic storage layers of the media. Data can be recorded using parallel or perpendicular recording techniques. In a perpendicular magnetic recording system, it is desirable to maximize write field strength to record more data in smaller spaces. The write pole directly defines the write field strength. Certain write pole designs may be capable of providing high write field strengths, but may also produce undesirable erasure fields.

SUMMARY

The present disclosure relates to write head having a write pole with a varied sidewall shape that is capable of providing high write field strengths with substantially low undesirable erasure fields. In one embodiment, a write head having a write pole tip is provided. The write pole tip includes a bearing surface and a sidewall extending from the bearing surface to a rear end of the write pole tip. The sidewall has a first shape (e.g., a straight-line sidewall shape) substantially at the bearing surface and a second shape (e.g., a multi-segment sidewall shape or a curved sidewall shape) between the bearing surface and the rear end.

Other features and benefits that characterize embodiments of the disclosure will be apparent upon reading the following detailed description and review of the associated drawings.

BRIEF DESCRIPTION OF THE DRAWINGS

FIGS. 5A, 5B, 6A and 6B are graphs including plots of parameter values associated with different write pole designs.

FIG. 6C is a diagrammatic illustration associated with the graphs of FIGS. 6A and 6B.

DETAILED DESCRIPTION OF ILLUSTRATIVE EMBODIMENTS

Embodiments of the disclosure relate to a write head having a write pole with a varied sidewall shape that is capable of providing high write field strengths with substantially low undesirable erasure fields. However, prior to providing additional details regarding the different embodiments, a description of an illustrative operating environment is provided below.

Figure 1A:
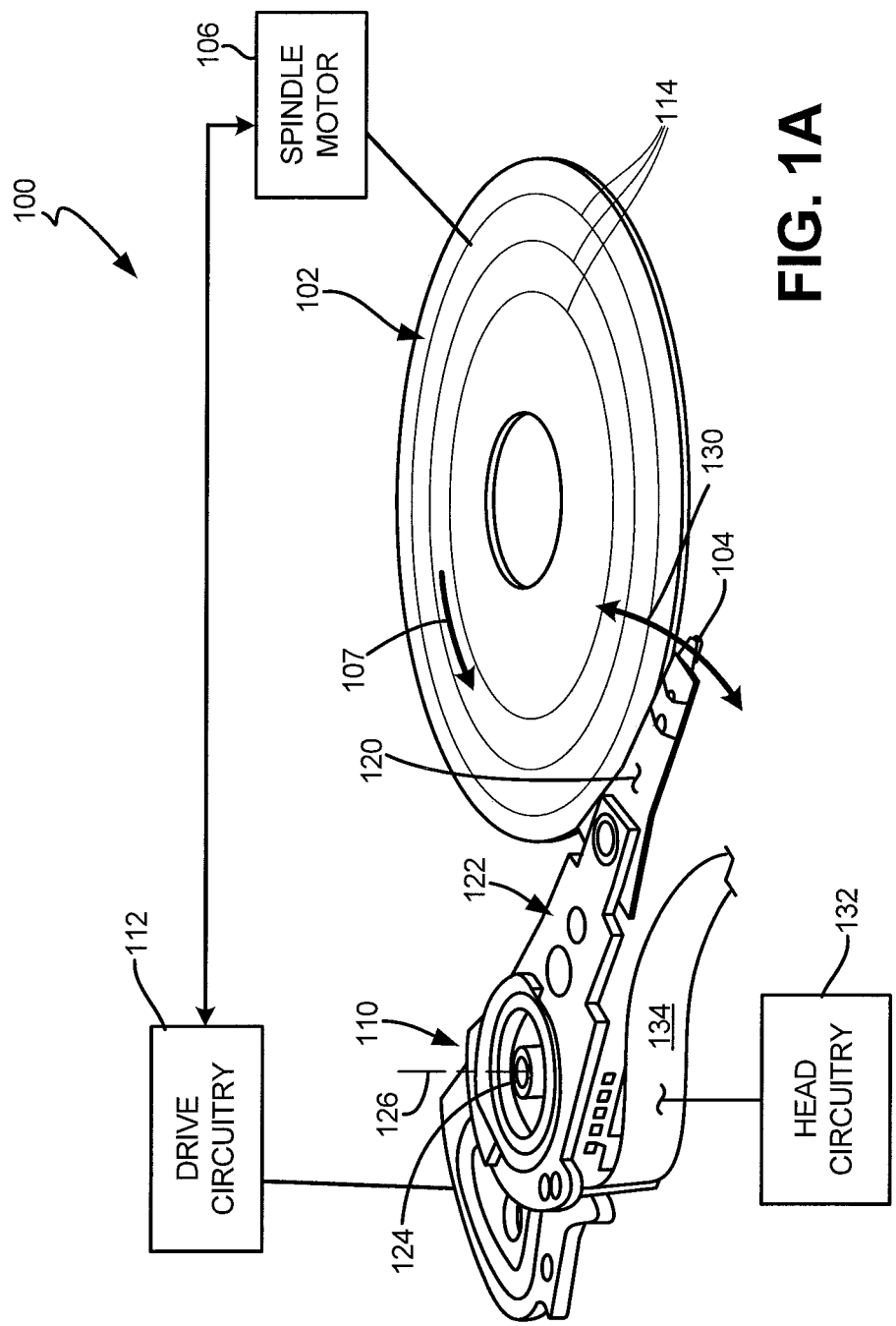
FIG. 1A illustrates an embodiment of a data storage device in which embodiments of the present application can be used.

FIG. 1A shows an illustrative operating environment in which certain write head embodiments formed as disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1A is a schematic illustration of a data storage device 100 including a data storage medium and a head for reading data from and/or writing data to the data storage medium. As shown in FIG. 1A, the data storage device 100 includes a magnetic data storage medium or disc 102 and a head 104. The head 104 including one or more transducer elements (not shown in FIG. 1A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks 114 on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 1A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 1B:
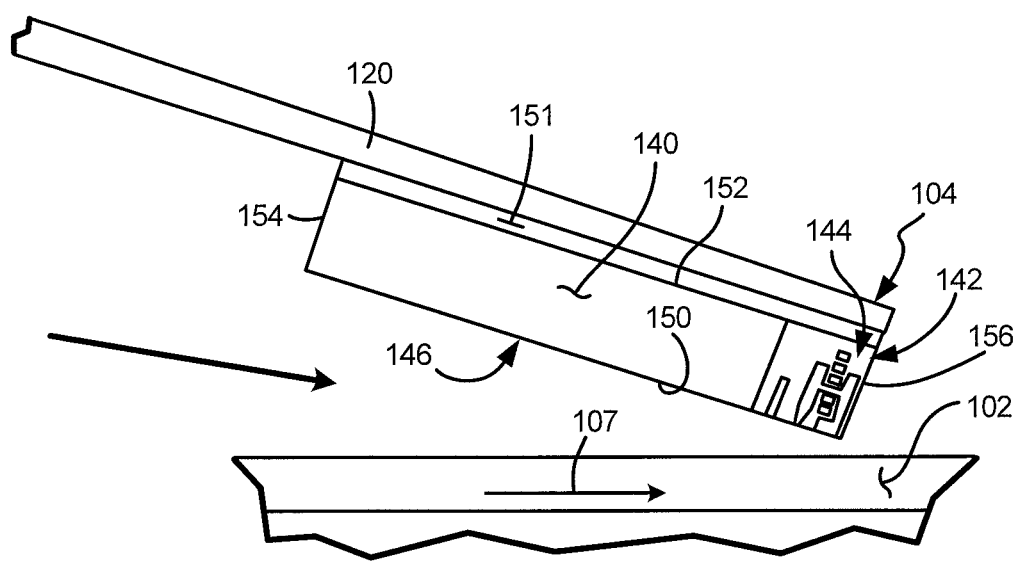
FIG. 1B is a schematic illustration of a head including one or more transducer elements above a magnetic recording medium.

FIG. 1B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 1B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140. A write pole portion of a transducer/head is described below in connection with FIGS. 2A, 2B and 2C.

Figure 2A:
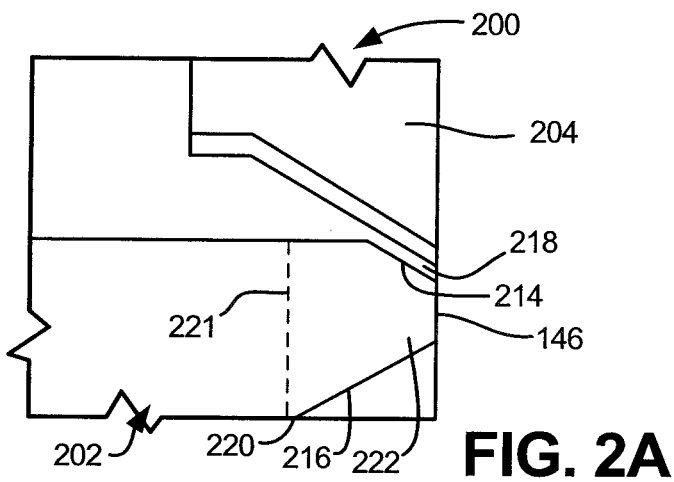
FIG. 2A is a schematic side view of a portion of a perpendicular magnetic recording (PMR) transducer.
Figure 2B:
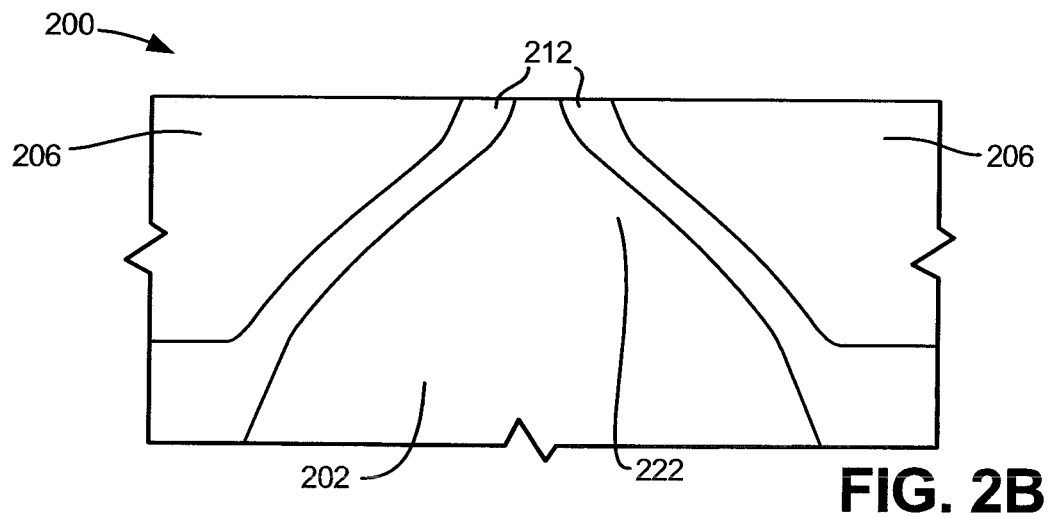
FIG. 2B is a top view of the PMR transducer of FIG. 2A.
Figure 2C:
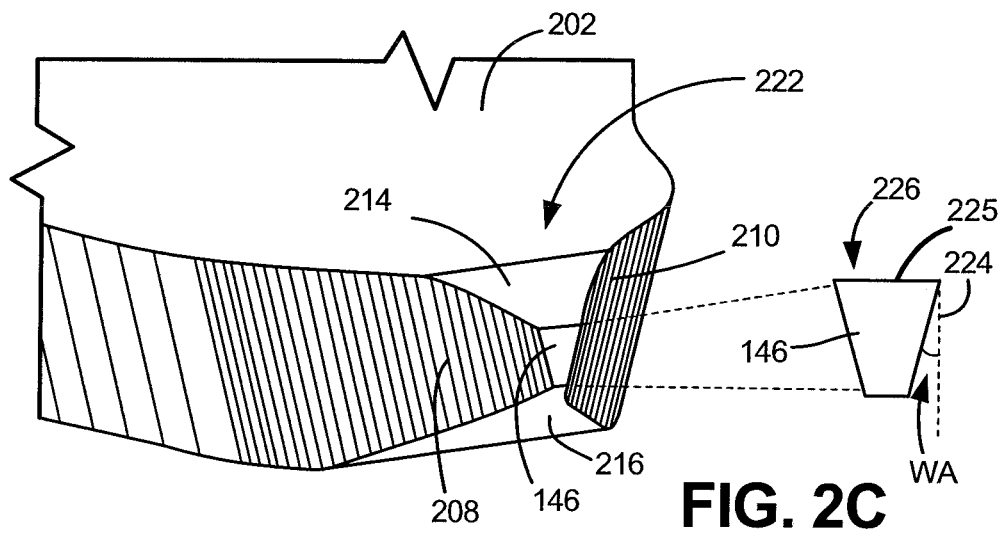
FIG. 2C is a perspective view of a write pole included in the PMR transducer of FIGS. 2A and 2B.

FIGS. 2A, 2B and 2C depict side, top and perspective views, respectively of a perpendicular magnetic recording (PMR) transducer portion 200. The PMR transducer portion 200 may be a part of a merged head including the write transducer portion 200 and a read transducer (not shown). Alternatively, the magnetic recording head may be a write head only including the write transducer portion 200.

The write transducer portion 200 shown includes a main pole or write pole 202, a front shield 204 and side shields 206. The main pole 202 resides over an under-layer (not shown) that may include multiple structures. As described above, a write transducer may also include other components including but not limited to coils (not shown) for energizing the write pole 202.

The write pole 202 includes sidewalls 208 and 210, which are separated from the side shields 206 by non-magnetic side shield gaps (SSGs) 212. The top (trailing) surface of the write pole 202 also has a beveled portion 214. The bottom (leading) surface of the write pole 202 may also include a leading surface bevel 216. A front shield gap (FSG) 218 is formed between the write pole 202 and the front shield 204.

A portion of the write pole 202 between the bearing surface 146 and a rear edge or end 220 of leading surface bevel 216 is a write pole tip 222 in the embodiment of FIGS. 2A, 2B and 2C. However, in other embodiments, the rear end 220 of the leading surface bevel 216 and the rear end of the write pole tip (denoted by reference numeral 221) may be proximate to each other instead of being at a same distance from the bearing surface 146. In general, a write pole tip such as 222 may be region of high flux concentration in the write pole 202.

As can be seen in FIG. 2C, at the bearing surface 146, the write pole tip 222 has a trapezoid shape with a trailing edge 225 and with a wall angle (WA), which is an angle between the sidewall 208, 210 and a down-track direction 224 as can be seen in enlarged view 226. In general, using relatively high WAs benefits tracks per inch (TPI) at skew mainly due to a low fringing field in a cross-track direction. However, such an approach reduces writeability and degrades on-track bits per inch (BPI). On the other hand, using a relatively low WA degrades TPI, but benefits writeability and BPI.

Figure 3C:
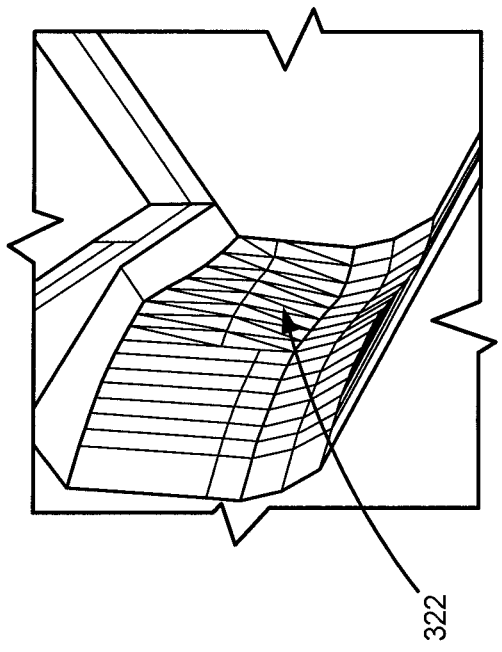
FIG. 3C is a perspective view of a side shield of a PMR transducer including the write pole of FIG. 3A.
Figure 3A:
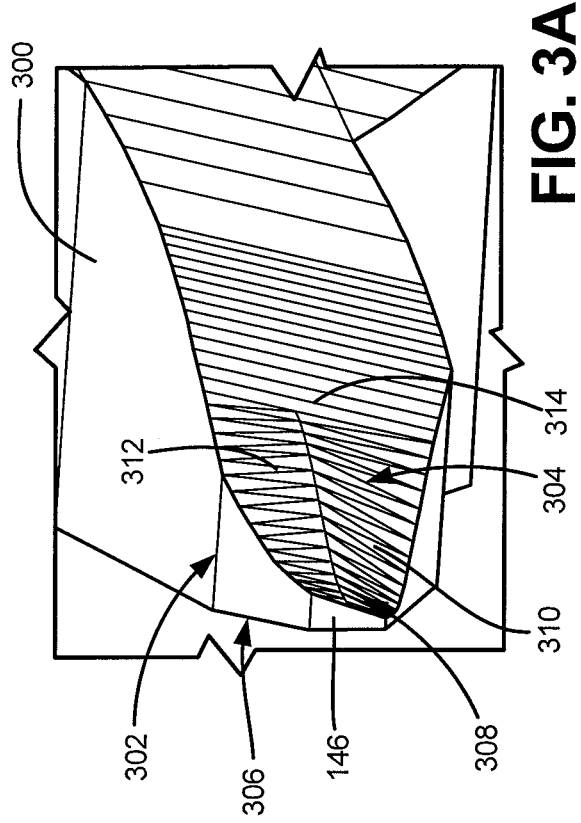
FIG. 3A is a perspective view of a write pole in accordance with one embodiment.

FIG. 3A is a perspective view of a write pole 300 in accordance with one embodiment. Pole 300 of FIG. 3A is illustratively included in a recording head such as recording head 104 of FIGS. 1A and 1B. As can be seen in FIG. 3A, write pole 300 includes a pole tip 302, which has a varied sidewall shape. As will be described further below using experimental results, such a varied sidewall shape is capable of providing high write field strengths with substantially low undesirable erasure fields. In FIG. 3A, only one sidewall 304 is shown in its entirety. An opposing sidewall 306 substantially similar to sidewall 304 may also be included. In write pole tip 302, the sidewall 304, 306 has a first shape 308 (e.g., a straight-line sidewall shape) at/near (or substantially at) the bearing surface 146 and a second shape (e.g., a multi-segment sidewall shape including segments 310 and 312) between the bearing surface 146 and a rear end 314. It should be noted that, although two segments 310 and 312 are shown in the embodiment of FIG. 3A, any suitable number of segments may be employed for the sidewall 304, 306 in different applications. In an alternate embodiment, the varied sidewall shape may include a straight-line sidewall shape 308 substantially at the bearing surface 146 and a curved (e.g., convex) sidewall shape behind the bearing surface. Variations of sidewall shape may be described in terms of WA and WA profile, which are shown in FIGS. 4A through 4CC.

Figure 4A:
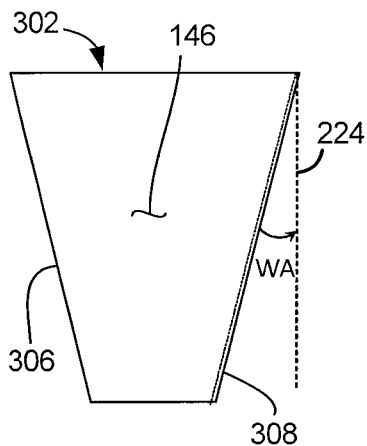
FIGS. 4A through 4CC are diagrammatic illustrations showing variations in sidewall shapes.
Figure 4A:
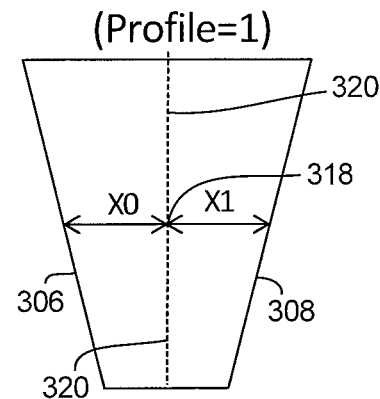

FIG. 4A is a bearing surface view of write pole tip 302, which is similar to enlarged view 226 of FIG. 2C. At and near the bearing surface 146, write pole tip 302 has a trapezoidal shape with a relatively high WA. It should be noted that other shapes (e.g., a triangular shape) may be employed for write pole tip 302 at the bearing surface 146. FIGS. 4B and 4C illustrate possible variations in sidewall shape between the bearing surface 146 and the rear end 314. Specifically, FIG. 4B shows the multi-segment sidewall shape, which includes segments 310 and 312 shown in FIG. 3A. FIG. 4C illustrates an alternate embodiment in which a curved sidewall shape 316 is employed instead of segments 310 and 312.

Figure 4B:
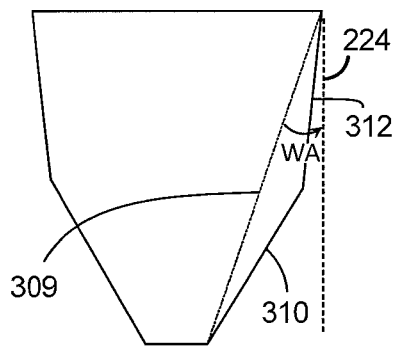
Figure 4B:
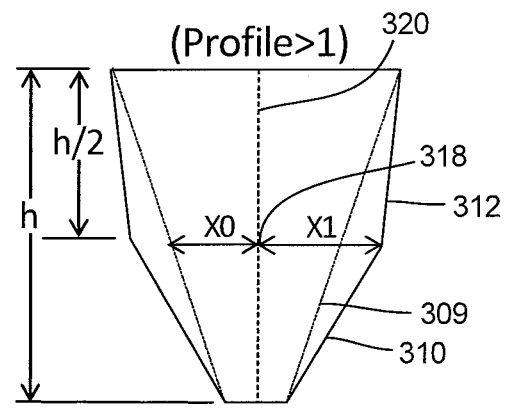
Figure 4C:
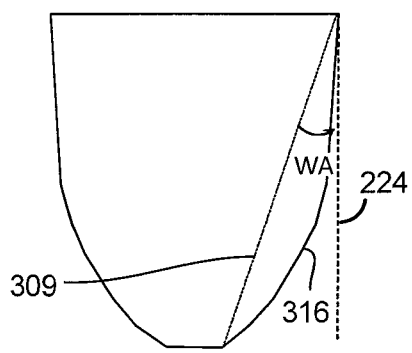
Figure 4C:
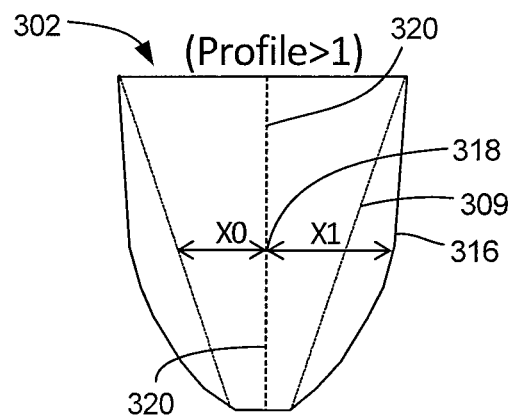

FIG. 4AA through 4CC are substantially similar to FIGS. 4A through 4C and are included to define a WA profile, which is a relative pole width difference, at a middle point of a write pole tip height, between an actual sidewall and a straight-line sidewall. In FIG. 4AA, the actual sidewall and the straight-line sidewall 308 coincide. In FIG. 4BB, the straight-line sidewall is represented by dashed line 309 and the actual sidewalls are formed of segments 310 and 312. In FIG. 4CC, as in the case of FIG. 4BB, the straight-line sidewall is represented by dashed line 309. However, as indicated above, the actual sidewalls are curved instead of segmented and denoted by reference numeral 316. As can be seen in FIGS. 4AA through 4CC, the height of the write pole tip 302 is denoted by "h" and therefore the middle point (denoted by reference numeral 318) is at h/2. Also, point 318 is located in the middle of dashed line 320, which divides the pole tip 302 into two substantially equal halves. In FIGS. 4AA-4CC, X0 is a horizontal distance between the middle point 318 and the straight-line sidewall 308, and X1 is a horizontal distance between the middle point 318 and the actual sidewall. In FIG. 4AA, the straight-line sidewall 308 is the actual sidewall. Thus, X0 is equal to X1 in FIG. 4AA. However, in FIGS. 4BB and 4CC, X1 is greater than X0. The WA profile may be expressed as:

$$\text{WA profile} = X1/X0 \quad \text{Equation 1}$$

Using Equation 1, the WA profile=1 for the shape shown in FIG. 4AA. However, the WA profile is greater than 1 for the shapes shown in FIGS. 4BB and 4CC. The greater the value of X1 relative to X0, the greater is the WA profile. A relatively high WA may be employed at/near the bearing surface to improve TPI, while a relatively high WA profile may be employed behind the bearing surface to obtain a better write field and gradient to improve BPI.

Figure 3B:
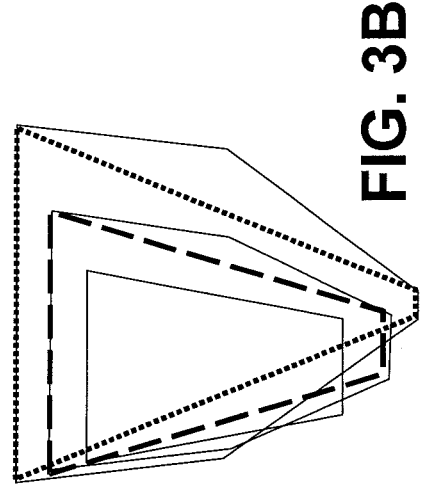
FIG. 3B is a diagrammatic illustration showing variations in wall angle profile going into the bearing surface of the write pole of FIG. 3A.

Accordingly, referring back to FIG. 3A, a relatively high WA may be employed substantially at the bearing surface 146 of write pole tip 302 and a relatively high WA profile may be employed behind the bearing surface 146. FIG. 3B illustrates variations in WA profile in write pole tip 302 going into the bearing surface 146. As indicated above, in addition to a write pole, a write head may include shields that substantially surround the write pole. FIG. 3C illustrates a side shield 322 that has a shape that conforms to a shape of the write pole tip sidewall 304, which includes segments 310 and 312.

Three key parameters are normally used in writer design:
(1) Peak write field→relates to a writer's writeability (how easy it is for the writer to switch a recording layer);
(2) Field gradient→relates to bit transition sharpness and linear density (BPI);
(3) Inflation→the difference between a magnetic write bubble width and a physical write pole width, which relates to track density (TPI).
In the description below, which is provided in connection with FIGS. 5A, 5B, 6A and 6B, the above-included three parameters are obtained for different write pole designs, and the obtained parameter values are used to evaluate the different designs.

Figure 5A:
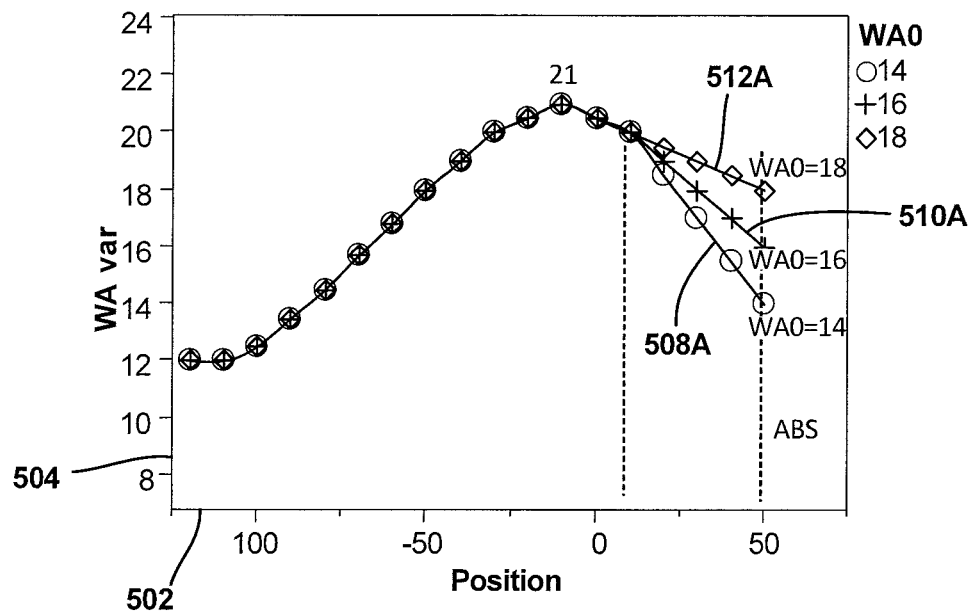
Figure 5B:
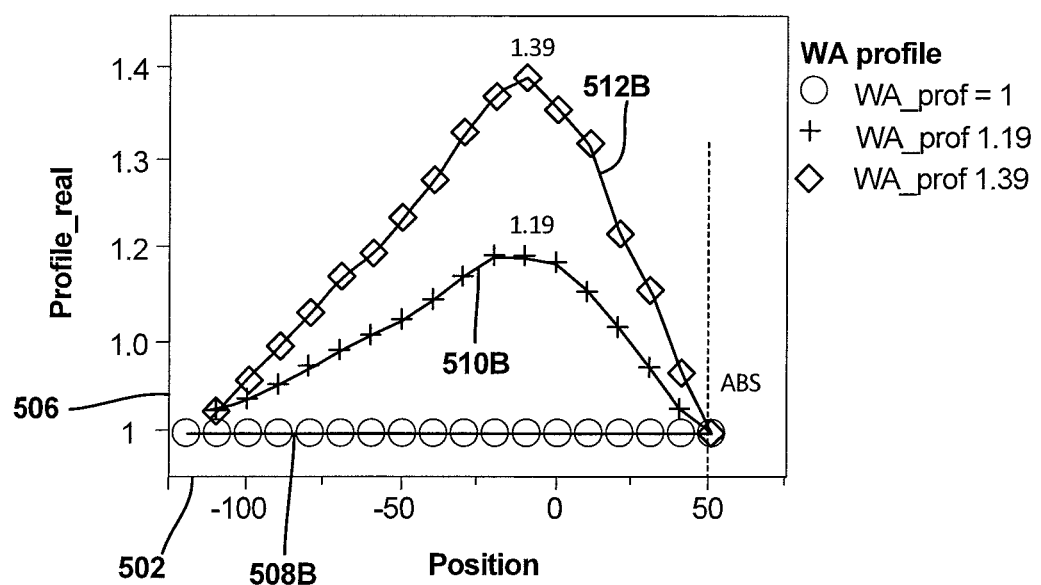

FIGS. 5A and 5B are graphs including plots for three design combinations of WA variations and WA profiles. In both FIGS. 5A and 5B, a horizontal axis 502 represents position. A bearing surface position is at point 50 on the horizontal axis 502, and points to the left of 50 indicate a direction going into the bearing surface. Point 0 of the horizontal axis indicates a breakpoint position behind the bearing surface. It should be noted that, in some embodiments, the breakpoint is a feature designed to produce a flux choke in the pole tip and is also employed as a reference point for process control. In FIG. 5A, a vertical axis 504 represents WAs in degrees. In FIG. 5B, a vertical axis 506 represents WA profiles. In FIGS. 5A and 5B, plots 508A and 508B, respectively, are for a first write pole design (Design 1), plots 510A and 510B are for a second write pole design (Design 2), and plots 512A and 512B are for a third write pole design (Design 3).

As can be seen in FIG. 5A, Design 1 (plot 508A) has a WA of 14 degrees at the bearing surface, Design 2 (plot 510A) has a WA of 16 degrees at the bearing surface, and Design 3 (plot 512A) has a WA of 18 degrees at the bearing surface. From plots 508A, 510A and 512A, it is seen that WAs are linearly varied behind the bearing surface until the breakpoint. The WAs are the same behind the breakpoint.

WA profiles, going into the bearing surface, for Designs 1-3 are shown in FIG. 5B. As can be seen in FIG. 5B, plot 508B has a straight line WA profile. Thus, in Design 1, only the WA, which is 14 degrees at the bearing surface, is varied without any WP profile variations. Plot 510B shows a WA profile of 1 at the bearing surface for Design 2, which has a WA of 16 degrees at the bearing surface as shown in FIG. 5A. As can be seen from plot 510B of FIG. 5B, a peak WA profile for Design 2 is 1.19. Plot 512B shows WA profile values for Design 3, which has a WA of 18 degrees at the bearing surface as shown in FIG. 5A. As can be seen from plot 512B of FIG. 5B, a peak WA profile for Design 3 is 1.39. Table 1 below includes a comparison of pole tip parameters and recording performances from modeling for Designs 1, 2 and 3.

TABLE 1

| Design | WA0 | Max_Profile | Max_Ht (Oe) | dHeff/dx(Oe/um) | Inflation (nm) | Ht_ati (Oe) |
|---|---|---|---|---|---|---|
| 1 | 14 | 1 | 8116.67 | −490500 | 30.5 | 1219.44 |
| 2 | 16 | 1.19 | 8460 | −505389 | 30.9 | 1204.17 |
| 3 | 18 | 1.39 | 8763.33 | −516000 | 31.4 | 1186.5 |

In Table 1 above, WA0 is a WA at the bearing surface, Max_Ht in Oersted (Oe) is a peak write field, dHeff/dx(Oe/micrometer (um)) is a down-track field gradient, and Ht_ati (Oe) is an adjacent track interference field. Also, in Table 1, the inflation is in nanometers (nm).

Simulation results in Table 1 above show that, with comparable inflation, Design 2 and Design 3 have much stronger fields and better gradients than Design 1. This indicates that, with similar TPI, designs with higher WAs plus larger WA profiles will generate better BPI and writeability than those with lower WAs plus a straight line profile.

Another write pole design comparison is provided below in connection with FIGS. 6A and 6B and Table 2. FIGS. 6A and 6B are graphs including plots for another example of a combination of WA variation and WA profile. The axes in FIGS. 6A and 6B are the same as the axes in FIGS. 5A and 5B, respectively. In FIGS. 6A and 6B, plots 600A and 600B, respectively, are for a fourth write pole design (Design 4) and plots 602A and 602B are for a fifth write pole design (Design 5). As can be seen in FIG. 6A, Design 4 (plot 600A) has a WA of 16 degrees at the bearing surface and Design 5 (plot 602A) has a WA of 18 degrees at the bearing surface. As can be seen in FIG. 6B, Design 4 (plot 600B) has a peak WA profile of 1.39. Further, to compensate the field loss from the higher WA in Design 5, a higher peak WA profile (1.59) is employed as can be seen in plot 602B. The WA variations going into the bearing surface (corresponding to plots 600A and 602A in FIG. 6A) are schematically illustrated in view 604 of FIG. 6C. The combined WA and WA profile variations going into the bearing surface (corresponding to plots in FIG. 6A plus 6B) are schematically illustrated in view 606 of FIG. 6C. Table 2 below includes a comparison of pole tip parameters and recording performances from modeling for Designs 4 and 5.

TABLE 2

| Design | WA0 | Max_Profile | Max_Ht (Oe) | dHeff/dx(Oe/um) | Inflation (nm) | Ht_ati (Oe) |
|---|---|---|---|---|---|---|
| 4 | 16 | 1.39 | 8729.71 | −518160.2 | 35.32 | 1172.53 |
| 5 | 18 | 1.59 | 8970.97 | −518633.0 | 30.95 | 1147.89 |

Results in Table 2 show that Design 4 and Design 5 have similar field and gradient values, but Design 5 has a much lower inflation than Design 4. This indicates that Design 4 and Design 5 have similar BPI and writeability, but Design 5 has a substantially better TPI than Design 4. This confirms again that write poles designed with higher WAs near the bearing surface and larger WA profiles behind the bearing surface can generate both on-track BPI and off-track TPI gain, and therefore net areal density capability (ADC) gains.

Figure 7:
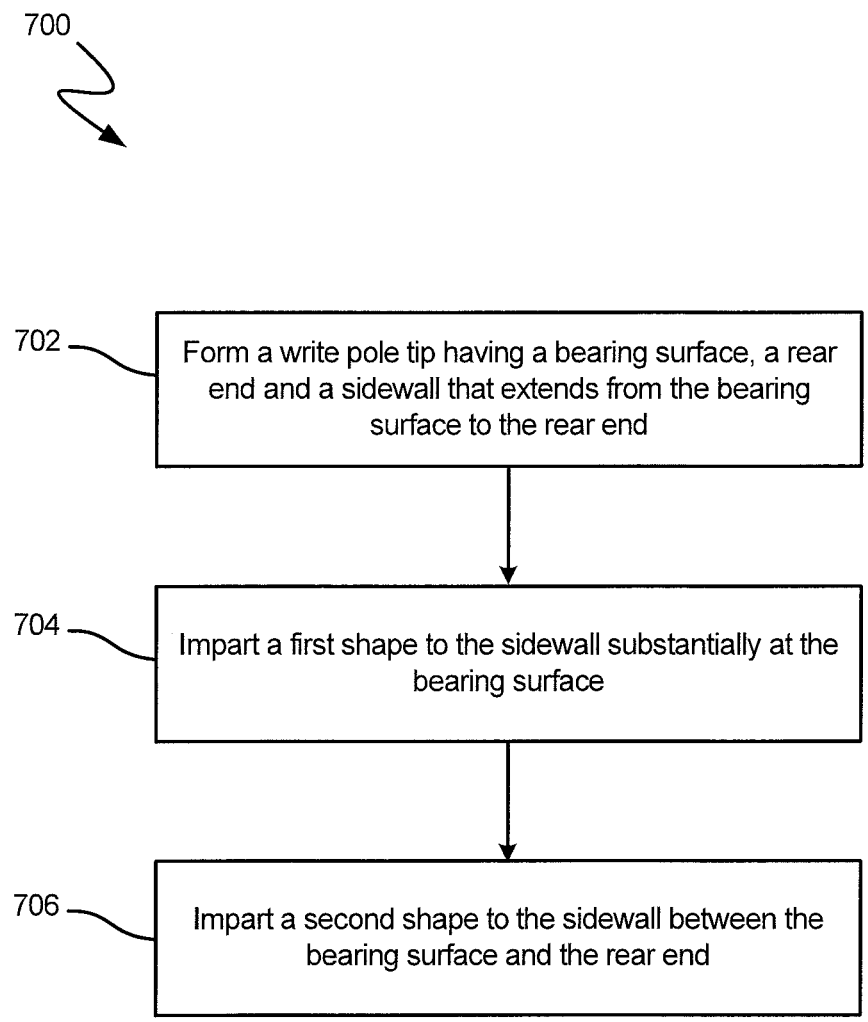
FIG. 7 is a flow diagram of a method embodiment.

FIG. 7 is a simplified flow diagram 700 of a method embodiment. Step 702 of the method involves forming a write pole tip having a bearing surface, a rear end and a sidewall that extends from the bearing surface to the rear end. At step 704, a first shape is imparted to a surface of the sidewall substantially at the bearing surface. At step 706, a second shape is imparted to the surface of the sidewall between the bearing surface and the rear end. The first shape is different from the second shape.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A write head comprising:
a write pole tip comprising:
a bearing surface;
leading and trailing edges; and
a sidewall extending from the bearing surface to a rear end of the write pole tip,
the sidewall has a first shape, which comprises a substantially straight-line sidewall shape, substantially at the bearing surface and below a plane that includes the entire trailing edge at the bearing surface and that is perpendicular to the bearing surface, and
the sidewall has a second shape between the bearing surface and the rear end below the plane, and
the sidewall has a wall angle that increases from the bearing surface to a position between the bearing surface and the rear end.

2. The write head of claim 1 and wherein the second shape comprises a multi-segment sidewall shape or a curved sidewall shape.

3. The write head of claim 1 and wherein a width of the leading edge decreases from the bearing surface to the position between the bearing surface and the rear end.

4. The write head of claim 2 and wherein the sidewall has a first wall angle profile at the bearing surface.

5. The write head of claim 4 and wherein the sidewall has a second wall angle profile between the bearing surface and the rear end, the second wall angle profile being different from the first wall angle profile.

6. The write head of claim 1 and wherein the sidewall has a first wall angle at the bearing surface and a plurality of different wall angles between the bearing surface and the rear end, and wherein each different wall angle of the plurality of different wall angles between the bearing surface and the rear end is different from the wall angle at the bearing surface.

7. The write head of claim 2 and wherein the sidewall has a first wall angle profile at the bearing surface and a plurality of different wall angle profiles between the bearing surface and the rear end, and wherein each different wall angle profile of the plurality of different wall angle profiles between the bearing surface and the rear end is different from the wall angle profile at the bearing surface.

8. A write head comprising:
a write pole tip comprising:
a bearing surface and a rear end, wherein the write pole tip is trapezoidal in shape at the bearing surface, and wherein the write pole tip comprises opposing upper and lower surfaces and opposing first and second sidewalls connecting the upper and lower surfaces and extending from the bearing surface to the rear end, the upper surface including a trailing edge and the lower surface including a leading edge; and
each of the first and second sidewalls has a first shape, which comprises a substantially straight-line sidewall shape, substantially at the bearing surface and below a plane that includes the entire trailing edge at the bearing surface and that is perpendicular to the bearing surface, and each of the first and second sidewalls has a second shape between the bearing surface and the rear end below the plane, and each of the first and second sidewalls has a wall angle that increases from the bearing surface to a position between the bearing surface and the rear end.

9. The write head of claim 8, wherein the upper and lower surfaces comprise beveled portions, and wherein the second shape comprises a multi-segment sidewall shape or a curved sidewall shape.

10. The write head of claim 9 and wherein a width of the leading edge decreases from the bearing surface to the position between the bearing surface and the rear end.

11. The write head of claim 9 and wherein each of the first and second sidewalls has a first wall angle profile at the bearing surface.

12. The write head of claim 11 and wherein each of the first and second sidewalls has a second wall angle profile between the hearing surface and the rear end, the second wall angle profile being different from the first wall angle profile.

13. A write head comprising:
a write pole tip comprising:
a bearing surface;
leading and trailing edges at the bearing surface; and
a sidewall extending from the bearing surface to a rear end of the write pole tip,
the sidewall has a first shape, which comprises a substantially straight-line sidewall shape, substantially at the bearing surface and below a plane that includes the entire trailing edge and that is perpendicular to the bearing surface, and the sidewall has a second shape, which comprises a multi-segment sidewall shape or a curved sidewall shape, between the bearing surface and the rear end below the plane, and the sidewall has a substantially same wall angle over an entire length of the write pole tip between the bearing surface and the rear end, and wherein the wall angle between the bearing surface and the rear end is an angle between a straight-line, parallel to the bearing surface and connecting a side edge of a leading surface of the write pole tip to a side edge of a trailing surface of the write pole tip on a same side of the write pole tip as the sidewall, and a down-track direction in any plane parallel to the bearing surface and between the bearing surface and the rear d.

14. The write head of claim 13 and wherein the sidewall has a first wall angle profile at the bearing surface and a second wall angle profile between the bearing surface and the rear end, and wherein the first wall angle profile is different from the second wall angle profile.

15. The write head of claim 13 and wherein the write pole tip is trapezoidal in shape at the bearing surface.

16. The write head of claim 15 and wherein the sidewall has a first wall angle profile at the bearing surface and a second wall angle profile between the bearing surface and the rear end, and wherein the first wall angle profile is different from the second wall angle profile.

\* \* \* \* \*

UNITED STATES PATENT AND TRADEMARK OFFICE
CERTIFICATE OF CORRECTION

| | | |
|---|---|---|
| PATENT NO. | : 10,643,644 B1 | Page 1 of 1 |
| APPLICATION NO. | : 15/895371 | |
| DATED | : May 5, 2020 | |
| INVENTOR(S) | : Jianhua Xue et al. | |

It is certified that error appears in the above-identified patent and that said Letters Patent is hereby corrected as shown below:

In the Claims

Column 10, Claim 13, Line 18, please replace the word "d" with the word --end--.

Signed and Sealed this
Twenty-ninth Day of September, 2020

Andrei Iancu
*Director of the United States Patent and Trademark Office*